May 12, 1953 H. E. ALBURN 2,638,470
PROCESS FOR THE PRODUCTION OF ALGINIC ACID SULFATE
Filed May 19, 1950 2 Sheets-Sheet 1
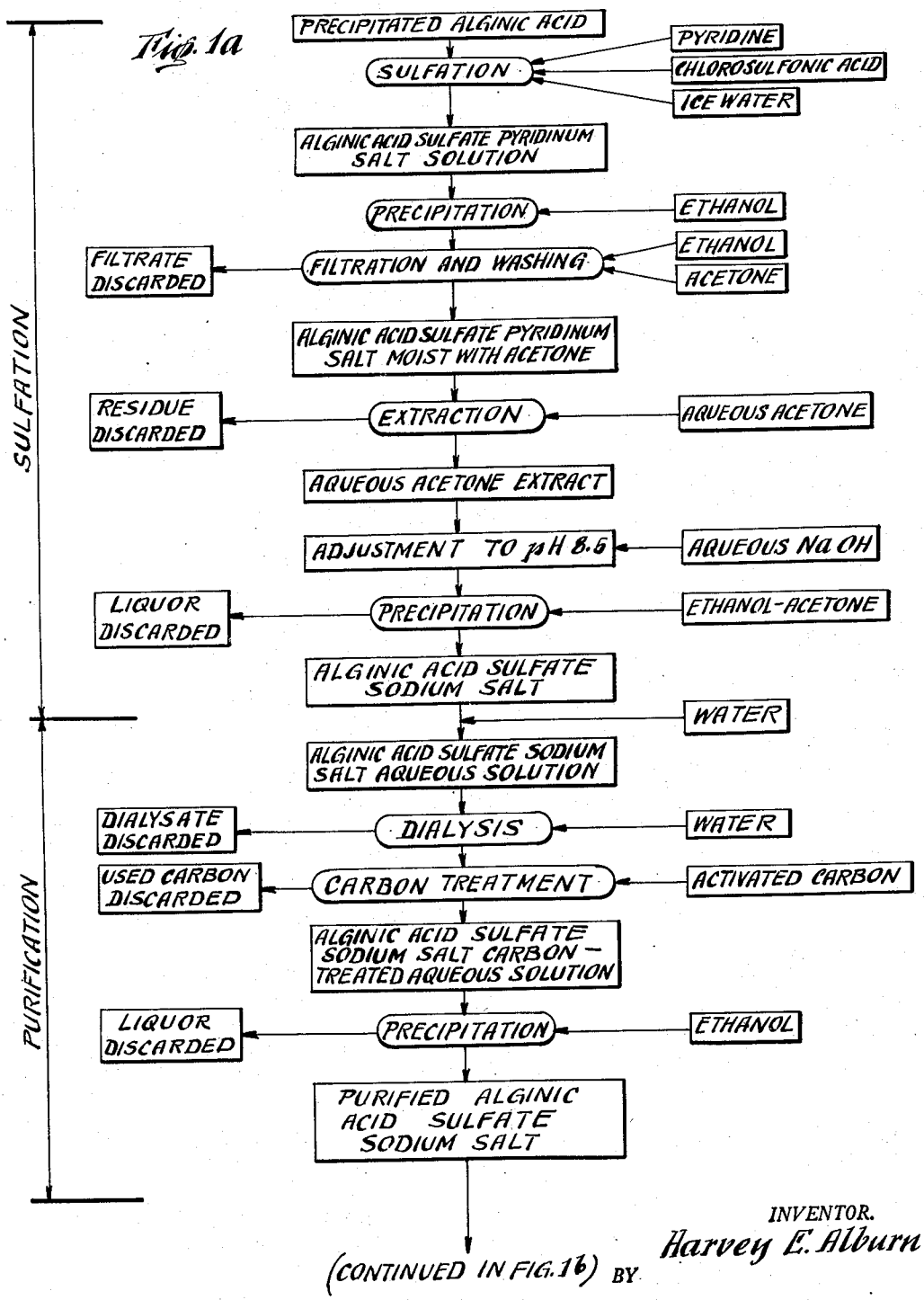
INVENTOR.
Harvey E. Alburn
BY
Marston L. Hamlin
ATTORNEY

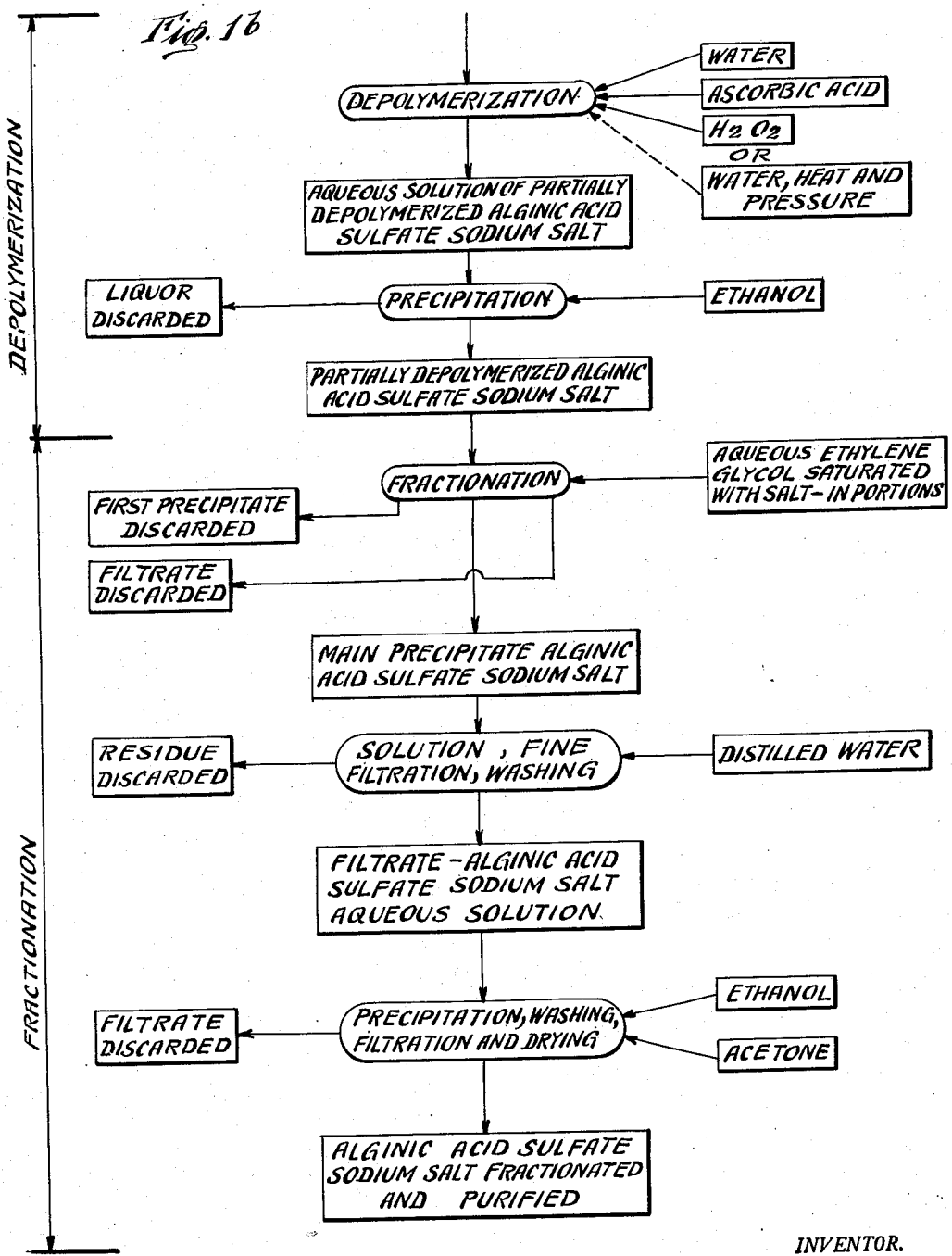

Patented May 12, 1953

2,638,470

UNITED STATES PATENT OFFICE 2,638,470

PROCESS FOR THE PRODUCTION OF ALGINIC ACID SULFATE

Harvey E. Alburn, Philadelphia, Pa., assignor, by mesne assignments, to American Home Products Corporation, New York, N. Y., a corporation of Delaware Application May 19, 1950, Serial No. 163,074

7 Claims. (Cl. 260—209.6)

This invention relates to an improvement in the production of alginic acid sulfate disclosed but not claimed in my patent application for Process For Alginic Acid Sulfate Production, Serial No. 163,073, filed May 19, 1950.

In copending patent application Serial No. 703,463, filed October 16, 1946, by Eric G. Snyder, for Alginic Acid Sulfate Anti-Coagulant, now U. S. Patent 2,508,433, a process is disclosed for producing alginic acid sulfate and its salts for use as a blood anti-coagulant. This process involves precipitating and drying commercial alginic acid, sulfating it under substantially anhydrous conditions with a sulfating agent such as chlorosulfonic acid in the presence of an acid acceptor such as pyridine, and recovering the desired salt, e. g. the sodium salt, from the sulfation mixture.

Alginic acid and its derivatives are polymeric materials, and, like most such materials, contain molecules of differing degrees of polymerization. In a material of a given average molecular weight molecular species of both lower and higher molecular weight will be present in varying ratios, depending on the starting material and on the conditions of sulfation. In this application when alginic acid, alginic acid sulfate or their salts are mentioned, these terms are intended to include such assemblages of molecular species of various degrees of polymerization.

Since molecules of varying molecular weight appear to have varying physiological effect, variations in molecular weight distribution of production batches result in rejection of such batches from time to time, when tested for activity and toxicity, owing to an undesirably high content of relatively more toxic high-polymer material and relatively inactive low-polymer material.

I have discovered that greatly improved constancy of product having a satisfactory ratio of therapeutic to toxic dosage can be attained by my improved process in which the molecular weight distribution is limited and controlled.

According to my invention I introduce a partial depolymerizing or degrading step into the process, controlling the depolymerization by viscosity or other molecular weight determinations, e. g. sedimentation rate or copper reduction, and preferably fractionate the partially depolymerized product by selective extraction or precipitation with suitable solvents; I also find it advantageous to introduce a dialyzing step into the process after sulfation to remove soluble inorganic salts and low-molecular-weight alginic acid sulfate. In this disclosure, for the sake of simplicity, I use the term alginic acid sulfate in a broad sense to include both the sulfate ester and its soluble salts, except as otherwise indicated.

In the present process I effect partial depolymerization after sulfation of the alginic acid.

While some of the advantages of my invention may be realized without employing the extraction, fractionation and dialysis steps, best results are secured when these steps are practised. A preferred operation, therefore, may comprise: (1) sulfation of alginic acid, (2) fractional extraction, (3) dialysis, (4) partial depolymerization, and (5) fractional precipitation.

The alginic acid may be made from an edible grade of sodium alginate by dissolution in about 75 parts of water, precipitation by about 1.6 parts of 1:1 hydrochloric acid, washing with water to pH 2.5–3.0 and air drying.

I can sulfate the alginic acid by treating a suspension of dry alginic acid in methanol at a low temperature, e. g. −15° to 35° C., with concentrated sulfuric acid, and isolating the alginic acid sulfate, e. g. as the sodium salt, from the sulfation mixture; or I can use a method based on the disclosure of the above cited Snyder application, viz. add alginic acid to a cooled mixture of chlorosulfonic acid and dry pyridine, and isolate the alginic acid sulfate from the sulfation mixture in the form of a desired soluble salt. For example, the crude pyridinium salt can be precipitated from aqueous solution with ethanol and dissolved in aqueous acetone; the solution can then be adjusted to a pH in the range 7–9, preferably to pH 8.5, with sodium hydroxide and the sodium salt of the sulfate ester precipitated with ethanol.

I can depolymerize or degrade the sulfate ester to the desired degree in various ways—for example by treating it in dilute aqueous solution with hydrogen peroxide in the presence of ascorbic acid at pH 4.0–6.0 or even pH 7.0, or by heating a dilute aqueous solution of the sodium salt under presure in an autoclave. The depolymerization is continued until a sample shows a desired predetermined viscosity in dilute aqueous solution. A satisfactory final viscosity may, for example, be in the range 1.04–1.12 centipoises for a 1% aqueous solution at 30° C.

Such a product will contain a smaller percentage of molecules of excessively high molecular weight and will run more uniform from batch to batch than a product made without the partial depolymerization step. Further improvement in uniformity, molecular weight distribution and physiological properties can, however, be effected by fractionation, e. g. by fractional precipitation. This can be carried out in several ways. For example, acetone may be added in portions to an aqueous solution of alginic acid sulfate, preferably containing dissolved sodium chloride; the first precipitate formed and separately collected is more toxic than later precipitates. Or the sulfate ester or its sodium salt can be mixed with a suitable salt solution, such as aqueous half-saturated disodium phosphate; a more toxic fraction remains undissolved and a suitable fraction may be recovered from the solution. I have, however, found the most effective fractionating agent to be aqueous ethylene glycol, e. g. ethylene glycol:water::9:1, preferably containing a soluble salt such as sodium chloride. Such a solution, added in suitable amounts to an aqueous solution of a soluble salt of the sulfate ester, will first precipitate a higher-molecular-weight more toxic fraction, say about 10% of the whole, which is separated and discarded; further addition of the ethylene glycol precipitant will precipitate a middle fraction, say 50–60% of the whole, which is collected, and the remainder discarded. The collected fraction will have a desirable anti-coagulant-toxicity ratio and be free of very high- and very low-molecular-weight material. Additional fractionation can be effected by extracting the crude pyridinium salt with aqueous acetone before conversion to the sodium salt; unsulfated alginic acid and some very high-molecular-weight material remain undissolved.

In the course of the preparation ethanol is the preferred precipitant of sulfate ester salts from aqueous solutions though other lower alcohols, acetone, methylethyl ketone, dioxane and the like may be used. Excess soluble inorganic salts can be removed at appropriate points by dialysis.

The final product, the sodium salt of alginic acid sulfate, is tested for anti-coagulant effect on rabbits and for toxicity on mice. A satisfactory product conforms to all the tests for heparin in New and Non-Official Remedies, 1949, page 620, except that it gives no test for nitrogen, which is absent from the molecule. The viscosity of the product in 1% aqueous solution lies preferably in the range 1.04–1.12 centipoises (Ostwald-Fenske pipette at 30° C.).

The accompanying drawing is a flow sheet of the process of my invention and is self-explanatory. Square boxes represent materials, and rounded boxes processes. Solid lines with arrow-heads indicate the flow of materials in one embodiment and dashed lines indicate alternative operations. Materials entering the process are shown at the right and those leaving the process at the left.

*Example I*

Alginic acid made from algin, as described above, is tested for suitability for use. It should contain less than 15% volatile matter and less than 3% ash; its solubility should be such that a 1% solution at pH 7.5 should be clear to insure the exclusion of uncarboxylated polysaccharides.

In the following description parts are expressed in metric units.

Nineteen parts by volume of pyridine (2° grade containing less than 0.4% water) are placed in a jacketed vessel ventilated with dry nitrogen and 4.67 parts by volume of chlorosulfonic acid are added with cooling. With the temperature under 65° C., 1 part by weight of alginic acid is added and the mixture stirred at 77±1° for 1 hour. The hot mixture is poured into 35 parts by volume of cracked ice and stirred until a clear solution is obtained. The crude pyridinium salt of alginic acid sulfate is then precipitated by stirring this solution into 4 times its volume of 95% denatured ethanol. The precipitate is then washed with 1.5 times the aqueous volume of ethanol and 3 times the aqueous volume of acetone. The excess acetone is removed and the damp precipitate is stored in a closed vessel until the water content (determined by distillation with xylene) and acetone content (total volatile matter minus water) have been determined. Then the precipitate is extracted with 12 parts by volume per part by weight of dry solids of 1:1 (volume/volume) aqueous acetone, allowance being made for the amounts of acetone and water already in the precipitate. The extraction is made by stirring vigorously for 2 hours in a closed vessel at room temperature.

The residue is centrifuged off and the supernatant solution is adjusted to pH 8.5, first with 50% and then with 5% sodium hydroxide solutions, thereby converting the pyridinium salt to the sodium salt. The solution is then mixed with 4 times its volume of 1:1 (volume/volume) ethanol-acetone, and the resulting precipitate filtered off and dissolved in water to make an approximately 10% solution. The solution is dialyzed for 16 hours in a counter-current dialyzer, then reconcentrated in vacuo at under 50° C. to an approximately 10% concentration. The solution is then stirred for 30 minutes with 250 grams per liter of activated carbon ("Norit" A), and the carbon is filtered off with a filter aid such as "Super Cel."

Alginic acid sulfate sodium salt is then reprecipitated with ethanol-acetone, filtered and washed. Ninety ml. of a 1.4% aqueous solution of the resulting alginic acid sulfate sodium salt, and 36 ml. 0.2 M ascorbic acid are mixed and held at 31° C. At intervals 0.1 ml. portions of 6% hydrogen peroxide are added with continued stirring and viscosities of the solution determined periodically. Typical results are as follows:

| Time, minutes | 6% H$_2$O$_2$ added, ml. | Viscosity centipoises [1] |
|---|---|---|
| 5 | | 1.25 |
| 35 | | 1.24 |
| 40 | 0.1 | |
| 50 | | 1.21 |
| 60 | 0.1 | |
| 70 | | 1.19 |
| 75 | 0.1 | |
| 90 | | 1.16 |
| 95 | 0.1 | |
| 105 | | 1.14 |

[1] 0.9% aqueous solution at 31° C.

The partially depolymerized product is precipitated with 4 volumes denatured ethanol, washed with ethanol and acetone, and dried. The precipitate is redissolved and fractionated as follows. The solution is stirred and a solution of 9:1 ethylene glycol-water (volume/volume) saturated with sodium chloride (NaCl content 7.4%) is added slowly. To determine the amount precipitated, samples are taken out at intervals, centrifuged, and the precipitate washed with ethanol and acetone and dried. About 10% of the solids, i. e. the higher molecular weight material, is precipitated first and discarded. Then 50–60% of the solids is precipitated as the usable fraction and the balance, lower molecular weight material, is discarded. The middle fraction, after collection by filtration, is dissolved in distilled water to make an approximately 10% solution and filtered through asbestos pads of very fine porosity (Republic #S-1) to remove all particulate matter, and the alginic acid sulfate sodium salt is precipitated with 4 volumes of 95% denatured ethanol. The precipitate is washed with twice the aqueous volume of ethanol and 4 times each with the aqueous volume of acetone. The acetone is filtered off and the product dried in a steam oven at 50° for 16 hours.

The product shows typical anti-coagulant effect without toxic symptoms when injected into rabbits in doses of 5 mg./kg.

*Example II*

The process is carried out as in Example I except that the partial depolymerization is effected by heating an aqueous solution under pressure, instead of by treating it with hydrogen peroxide in the presence of ascorbic acid.

A 3% aqueous solution of alginic acid sulfate sodium salt is autoclaved for 50 minutes at 122° C. The solution is cooled and the salt precipitated with ethanol-acetone and further worked up by fractionation as in Example I.

I claim:

1. In a process of producing an alginic acid sulfate composition having a restricted content of very high-polymer and very low-polymer molecular species, in which process alginic acid is sulfated, the improved steps which comprise: sulfating alginic acid to produce a sulfate ester, partially depolymerizing the sulfate ester by exposing it to a liquid depolymerizing medium containing at least a small amount of water at a temperature in the approximate range 31°–122° C. for a time sufficient to substantially reduce the viscosity of an aqueous solution of a sodium salt thereof, isolating the partially depolymerized alginic acid sulfate as a water-soluble salt and fractionating the salt by selective precipitation from aqueous solution by means of a neutral oxygen-containing organic liquid precipitant miscible with water, discarding a first fractional precipitate and collecting a middle fraction, whereby a salt is obtained having a restricted content of very high-polymer and very low-polymer molecular species, a high blood-anticoagulant effect and low toxicity.

2. The steps defined in claim 1, in which partial depolymerization is effected by treating the alginic acid sulfate in water with hydrogen peroxide in the presence of ascorbic acid.

3. The steps defined in claim 1, in which partial depolymerization is effected by heating the alginic acid sulfate with water under superatmospheric pressure.

4. The steps defined in claim 1, in which the salt is sodium salt and the selective precipitant is aqueous ethylene glycol containing dissolved sodium chloride.

5. The process of producing the sodium salt of alginic acid sulfate in a form having a restricted content of very high-polymer and very low-polymer molecular species which comprises the following combination of steps: sulfating dried alginic acid by stirring it in a mixture of dry pyridine and chlorosulfonic acid in an approximate temperature range of 65°–80° C., quenching the sulfation mixture in cracked ice, precipitating and separating the crude pyridinium salt of the sulfate ester by the addition of ethanol to the resulting aqueous solution, extracting the precipitated salt with aqueous acetone, converting the dissolved pyridinium salt to the sodium salt by adding aqueous sodium hydroxide to the extract to approximately pH 8.5, precipitating and separating the sodium salt with an ethanol-acetone mixture, redissolving the sodium salt in water, partially depolymerizing the dissolved sodium salt by treating it with hydrogen peroxide in the presence of ascorbic acid until the sodium salt has a viscosity in a neutral 1% aqueous solution at 30° C. of approximately 1.04–1.14 centipoises, cooling and dialyzing the solution and reconcentrating the dialyzed solution, fractionally precipitating from the solution a minor fraction of high-polymer material by adding to the solution a portion of aqueous ethylene glycol in the presence of added sodium chloride, and thereafter fractionally precipitating from the solution and separately collecting a major fraction of material of restricted high- and low-polymer content by adding a further portion of said ethylene glycol precipitant to the solution.

6. The process of producing the sodium salt of alginic acid sulfate in a form having a restricted content of very high-polymer and very low-polymer molecular species which comprises the following combination of steps: sulfating dried alginic acid by stirring it in a mixture of dry pyridine and chlorosulfonic acid in an approximate temperature range of 65°–80° C., quenching the sulfation mixture in cracked ice, precipitating and separating the crude pyridinium salt of the sulfate ester by the addition of ethanol to the resulting aqueous solution, extracting the precipitated salt with aqueous acetone, converting the dissolved pyridinium salt to the sodium salt by adding aqueous sodium hydroxide to the extract to a pproximately pH 8.5, precipitating and separating the sodium salt with an ethanol-acetone mixture, re-dissolving the sodium salt in water, partially depolymerizing the dissolved sodium salt by heating the solution under superatmospheric pressure until the sodium salt has a viscosity in a neutral 1% aqueous solution at 30° C. of approximately 1.04–1.14 centipoises, cooling and dialyzing the solution and reconcentrating the dialyzed solution, fractionally precipitating from the solution a minor fraction of high-polymer material by adding to the solution a portion of aqueous ethylene glycol in the presence of added sodium chloride, and thereafter fractionally precipitating from the solution and separately collecting a major fraction of material of restricted high- and low-polymer content by adding a further portion of said ethylene glycol precipitant to the solution.

7. The process of producing an alginic acid sulfate composition having a restricted content of very high-polymer molecular species which comprises the following combination of steps: sulfating alginic acid to form a sulfate ester thereof and partially depolymerizing the sulfate ester by exposing it to a liquid depolymerizing medium containing at least a small amount of water at a temperature in the approximate range 31°–122° C. for a time sufficient to substantially reduce the viscosity of a 1% aqueous solution of a sodium salt of the sulfate ester to a point within the approximate range 1.0–1.14 centipoises at 30° C., fractionating a water-soluble salt of the partially depolymerized sulfate ester by dissolving it in water, selectively precipitating successive fractions from the aqueous solution by adding a neutral water-miscible oxygen-containing organic liquid precipitant in portions, discarding a first fractional preciciptate and collecting a middle fraction, whereby a salt is obtained having a restricted content of very high-polymer and very low-polymer molecular species, a high blood-anticoagulant effect and low toxicity.

HARVEY E. ALBURN.

References Cited in the file of this patent

UNITED STATES PATENTS

| Number | Name | Date |
|---|---|---|
| 2,508,433 | Snyder | May 23, 1950 |

FOREIGN PATENTS

| Number | Country | Date |
|---|---|---|
| 603,571 | Great Britain | June 18, 1948 |

OTHER REFERENCES

Snellman et al., Chem. Abs., v. 44 (1950) 1227b, 1 page.

Von Kaulla et al., Chem. Abs., v. 44 (1950) 3914g, 1 page.